United States Patent [19]
Fiden

[11] Patent Number: 4,733,238
[45] Date of Patent: Mar. 22, 1988

[54] METHOD AND SYSTEM FOR RADAR COMPATIBLE DATA COMMUNICATION

[75] Inventor: William H. Fiden, Woodland Hills, Calif.

[73] Assignee: Hughes Aircraft Company, Los Angeles, Calif.

[21] Appl. No.: 931,282

[22] Filed: Nov. 17, 1986

[51] Int. Cl.$^4$ ............................................. G01S 13/86
[52] U.S. Cl. ........................................................ 342/60
[58] Field of Search ............................................ 342/60

[56] References Cited

U.S. PATENT DOCUMENTS

| | | | |
|---|---|---|---|
| 2,613,348 | 10/1952 | Stodola | 342/60 X |
| 3,460,139 | 8/1969 | Rittenbach | 342/60 |
| 3,550,124 | 12/1970 | Heft et al. | 342/60 X |
| 3,946,384 | 3/1976 | Westaway | 342/60 |
| 4,458,246 | 7/1984 | Filipsson et al. | 342/60 |

*Primary Examiner*—T. H. Tubbesing
*Attorney, Agent, or Firm*—Charles D. Brown; A. W. Karambelas

[57] ABSTRACT

A method and a system which allows for simultaneous radar tracking and data communication. The method of the invention includes the steps of (a) encoding a radar transmit signal with message data in a transmitter; (b) receiving transmitted returns of said encoded radar signal in a first receiver; (c) decoding said received return signal to eliminate message data; (d) receiving said encoded radar signal in a second receiver; and (e) decoding said received radar signal to extract said message data. The system of the invention includes a transmitter equipped for encoding a radar transmit signal with message data; a first receiver capable of decoding returns from said transmitter signal to eliminate said message data; and a second receiver capable of decoding said radar signal to extract the message data.

34 Claims, 9 Drawing Figures

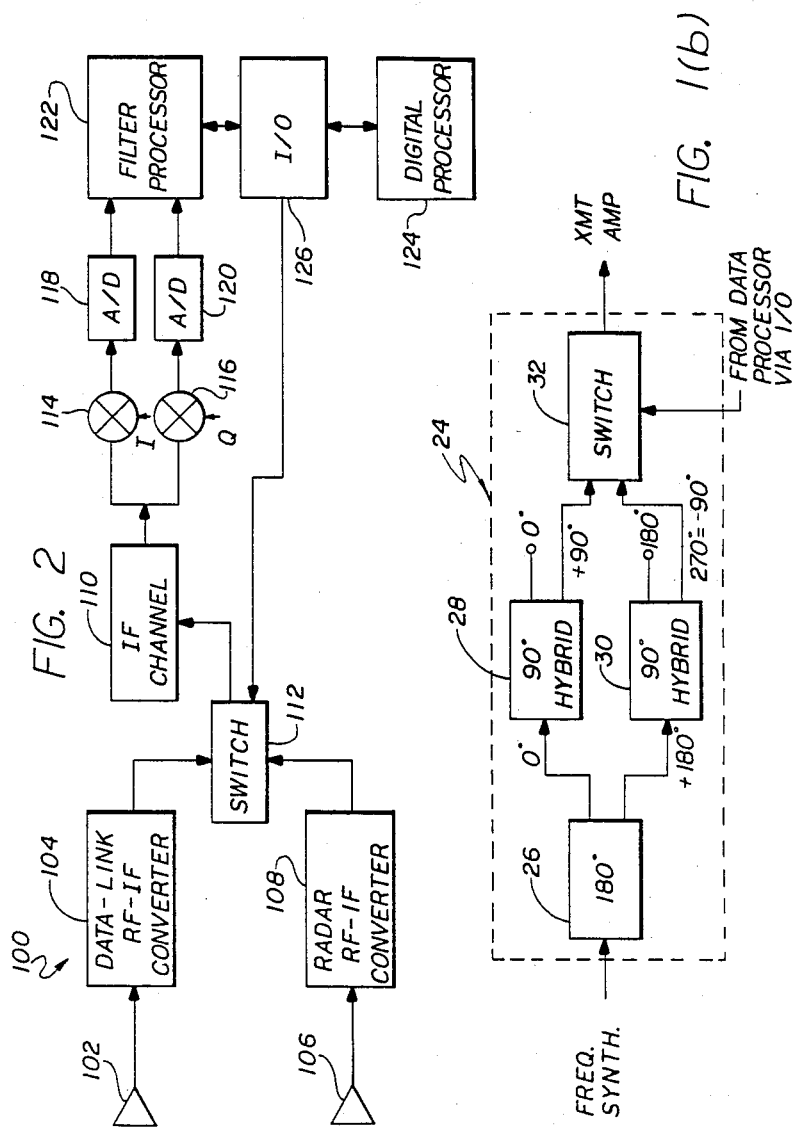

METHOD AND SYSTEM FOR RADAR COMPATIBLE DATA COMMUNICATION

BACKGROUND OF THE INVENTION

1. Field of the Invention:

The present invention relates to communication systems. More specifically, the present invention relates to data communications systems used in conjunction with radar systems.

While the invention is described herein with reference to an illustrative embodiment for a particular application, it is understood that the invention is not limited thereto and those of ordinary skill in the art, with access to the teachings herein, will recognize additional modifications, applications, and embodiments within the scope thereof.

2. Description of the Related Art:

In airborne, shipborne, and land based systems equipped with a radar tracking capability, it is often desirable to use the radar system hardware for communication. In many cases, this dual use of preexisting hardware allows lighter, smaller, and less costly overall communication and tracking systems.

However, a significant operational limitation may be imposed on such dual purpose systems designed using conventional technology. The limitation arises in the ability of a first radar equipped system to track while communicating with a second system. These systems must typically inhibit radar tracking transmissions while communicating so that a message may be transmitted without affecting the radar returns. This limits the ability of the first system to track friendly or unfriendly rapidly moving vehicles.

SUMMARY OF THE INVENTION

The present invention addresses the need in the related art for a method and a system which allows for simultaneous radar tracking and data communication. The method of the invention includes the steps of (a) encoding a radar transmit transit signal with message data in a transmitter; (b) receiving returns of said encoded radar signal in a first receiver; (c) decoding said received radar signal to eliminate said message data; (d) receiving said encoded radar signal in a second receiver; and (e) decoding said received radar signal to extract said message data.

The system of the invention includes a transmitter equipped for encoding a radar transmit signal with message data; a first receiver capable of decoding returns from said transmitted signal to eliminate said message data; and a second receiver capable of decoding said encoded radar signal to extract said message data.

BRIEF DESCRIPTION OF THE DRAWINGS

FIG. 1(b) is a block diagram representation of the bi-phase modulator of the present invention.

FIG. 2 is a block diagram representing the second receiver of the present invention.

DESCRIPTION OF THE INVENTION

As disclosed more fully below, the present invention provides a method and system with simultaneous radar tracking and data communication capabilities. The advantageous operation is afforded by phase modulation of the radar signal with the communication signal. The modulation is removed by the radar to process the radar returns. The modulation is extracted by the communication receiver to extract the message data.

Figures 1, 1A:
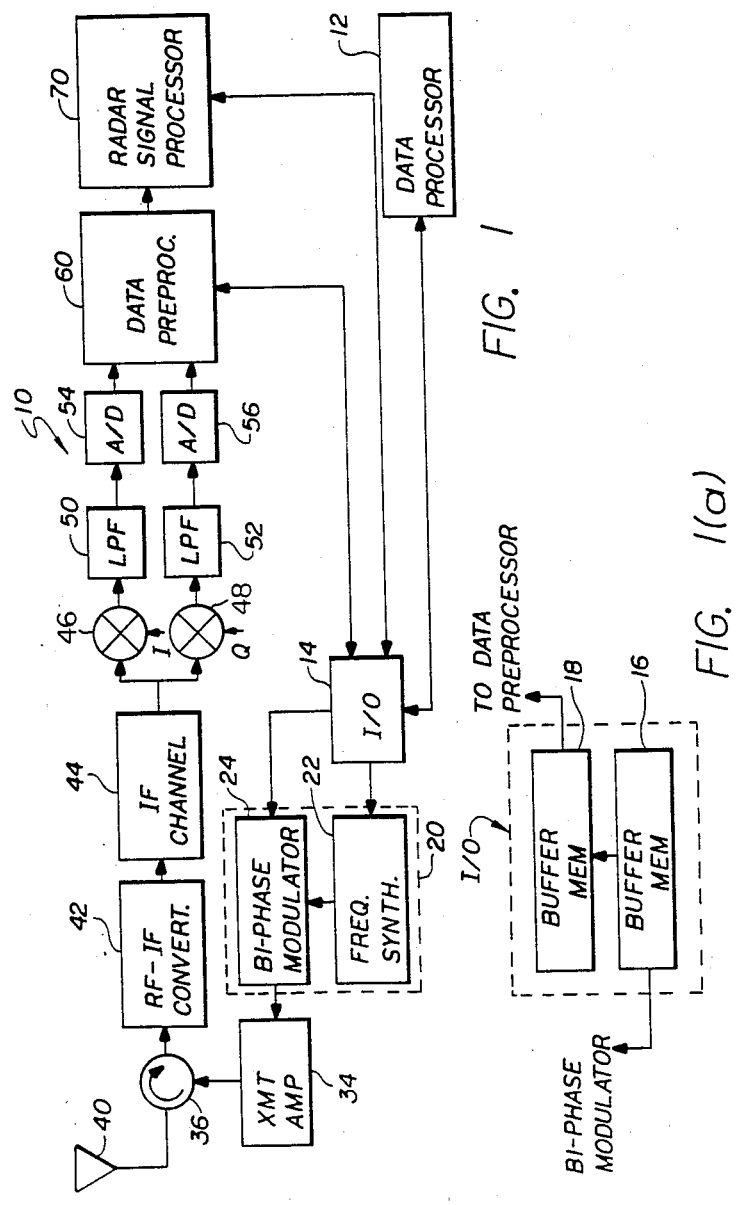
FIG. 1 shows a block diagram representation of a combined radar transmitter/receiver 10 of the present invention.
FIG. 1(a) is a more detailed block diagram representation of the input/output subsystem of the present invention.

FIG. 1 shows a block diagram representative of the combined radar transmitter/receiver 10 of the present invention. As discussed more fully below, the transmitter section provides a radar signal which is encoded with message data of a communication signal. The receiver section is a first of two receivers used with the present invention, the second receiver 100 being shown in FIG. 2 and described more fully below.

As shown in FIG. 1, the transmitter/receiver 10 operates under control of a master data processor 12. The master data processor 12 performs numerous conventional functions such as determining whether or not radar targets have been detected and the filing and tracking thereof. In addition, the master data processor, as utilized in connection with the present invention, provides message data for transmission and decodes the radar returns. The master data processor 12 may be implemented digitally as is known in the art to provide for the transmission of any suitable message to one or more second receivers.

As part of the illustrative embodiment of FIG. 1, the data processor 12 provides, for transmission, a series of digital words which are stored in an input/output (I/O) circuit 14 in a first buffer 16. While the I/O circuit 14 is shown simplified in FIG. 1a, it is understood that it would include components (not shown) which would pass commands from the data processor 12 to a frequency reference unit 20.

The frequency reference unit 20 includes a conventional frequency synthesizer 22 and a bi-phase modulator 24. The frequency synthesizer 22 may include a voltage controlled oscillator and phase locked loop (neither shown) as is known in the art. The commands are passed through the I/O 14 from the data processor 12 and used by the frequency synthesizer 22 to establish a fundamental radar transmit frequency.

The bi-phase modulator 24 modulates the phase of the fundamental radar transmit frequency to encode the message data thereon. An illustrative implementation of a bi-phase modulator is shown in the block diagram of FIG. 1(b). The bi-phase modulator 24 may be implemented with a balanced mixer as is known in the art. The bi-phase modulator 24 of the present invention is shown implemented by a number of hybrid phase shifters 26, 28 and 30 and a switch 32. Depending on the application, the hybrid phase shifters may be implemented using inductive/capacitative components or high frequency transmission lines as is known in the art. The first phase shifter 26 provides two output signals which embody the input fundamental frequency from the frequency synthesizer 22 shifted in phase by 0 and +180 degrees. Each output is input to a 90 degree phase shifter 28 and 30 respectively. Thus, four signals are output which provide the fundamental radar frequency shifted in phase by 0, +90, +180 and +270 (or −90) degrees. The +90 degree output and the −90 degree output are input to the switch 32. The switch 32 may be implemented with a diode switch. The switch 32 operates under control of the data processor 12 via the I/O circuit 14 to modulate the fundamental radar frequency by the message data. The bi-phase modulator thereby imposes a positive or negative phase shift of 90 degrees depending on each digital bit in the message word stored in the I/O buffer 16. In effect, the bi-phase modulator provides a mixer for modulating the phase of a radar transmit signal. Thus, the bi-phase modulator provides means for encoding the radar transmit signal with message data.

Returning now to FIG. 1, the output of the bi-phase modulator 24 is amplified by a conventional transmit amplifier 34 and input to a conventional circulator 36. The circulator 36 allows a single antenna 40 to be used for transmission and reception as is known in the art. In the transmit mode, the receiver is disabled and a phase modulated radar signal is transmitted. To receive the radar returns, the circulator enables the receiver.

The receiver of FIG. 1 is a first receiver and includes a conventional radio frequency (RF) to intermediate frequency (IF) converter 42 and an IF channel 44. The RF-IF converter includes RF amplifiers and downconverters as is known in the art. The IF channel provides IF amplification. While it will be understood by those of ordinary skill in the art that a number of IF channels may be employed, the embodiment of FIG. 1 is simplified by showing a single IF channel 44.

The output of the IF channel 44 is split into in-phase and quadrature signals by mixers 46 and 48, filtered by low pass filters 50 and 52 and digitized by analog-to-digital (A/D) convertors 54 and 56 as is typical of conventional radar signal processing schemes. The phase of the digitized signals is represented by a sign bit in the digital word.

Figure 3A:
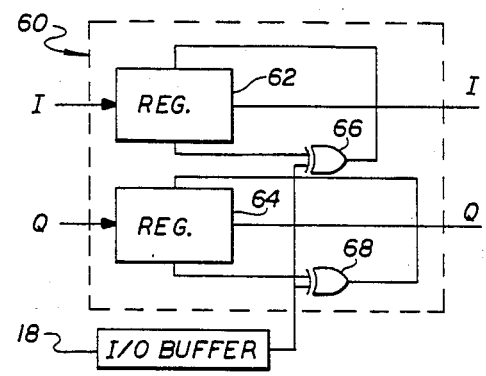
FIG. 3(a) is a first implementation of the data pre-processor of the present invention.
Figure 3B:
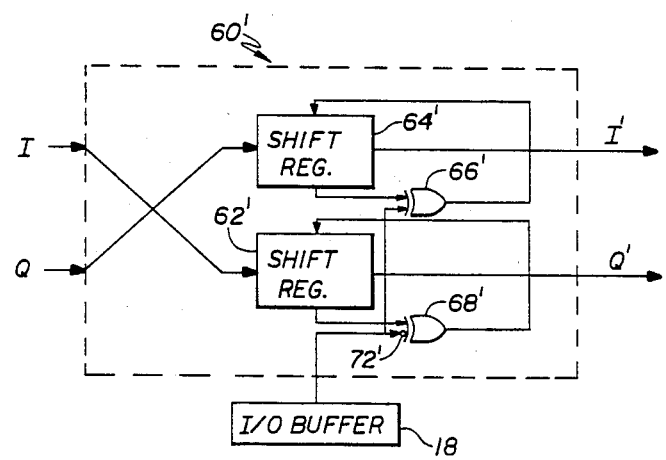
FIG. 3(b) is a second implementation of the data pre-processor of the present invention.

The digitized in-phase and quadrature signals are input to a data pre-processor 60. Alternative implementations of the data pre-processor 60 are shown in FIGS. 3(a) and 3(b). The data pre-processor 60 provides means for decoding returns from the radar transmit signal to eliminate the encoded message. The data pre-processor 60 performs the function of shifting the phase of the radar signal depending on the known phase modulation of the transmitted signal provided by I/O buffer 18.

Figure 4:
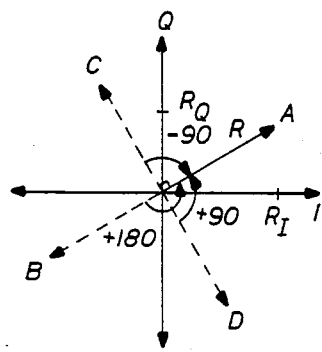
FIG. 4 is a phasor diagram of the signal processed by the data pre-processor of the present invention.

FIG. 3(a) shows a first embodiment which includes first and second shift registers 62 and 64 which store the digitized in-phase and quadrature signals respectively for a given clock period. The sign bit of each register 62 and 64 is a first input to an exclusive-OR (XOR) gate 66 and 68 respectively. A second input to each XOR gate is provided by the second I/O buffer 18. The second buffer 18 is loaded with the data message word when the data message word is read from the first buffer 16 into the bi-phase modulator 24 for transmission. See FIGS. 1 and 1(a). The second buffer thus provides an indication of the modulation history of the received radar signal. When the transmitted signal has a positive 90 degree phase modulation or shift, the data pre-processor of FIG. 3(a) passes the digitized signals on to a conventional radar signal processor 70 without any additional phase shift. (See FIG. 1.) When, however, the transmitted signal was modulated with a negative 90 degree phase shift, the data pre-processor 60 shifts the phase of the received radar signal by 180 degrees. FIG. 4 shows, vectorially, the operation of the data pre-processor 60. When the transmitted signal is shifted in phase by +90 degrees, the resultant signal represented by R is at position A. The corresponding in-phase and quadrature signals RI and RQ are shown on the I and Q axes respectively. When the transmitted signal is shifted in phase by a −90 degrees, the resultant signal is offset 180 degrees as shown at B in FIG. 4.

This is accomplished by changing the sign bit from say a logical '1', representing a positive phase angle to a logical '0' representing a negative phase angle. Whether changed or not, the sign bit is replaced in the register and becomes, once again, part of the digital word representing the in-phase or quadrature component of the received radar signal. As such, the in-phase and quadrature signals are then read and processed by the radar signal processor 70 in a conventional manner.

Thus, by shifting the phase of the resultant signal by 180 degrees in response to a −90 phase modulation of the transmitted signal, the phase modulation is a constant value which is easily removed or ignored by the radar signal processor 70. FIG. 3(b) shows an alternative embodiment for the data pre-processor 60' in which the convention of shifting the received radar signal by 0 degrees in response to a +90 degree phase shift and by +180 in response to a −90 degree phase shift is replaced by one in which a shift of −90 degrees in response to a +90 degree phase modulation and by +90 degrees in response to a −90 degree modulation. This is accomplished by: (1) the reversal of the inputs to the shift registers such that the digitized in-phase signals are stored in the second register 64' and the digitized quadrature signals are stored in the first register 62' and (2) adding an inverter 72' to one of the inputs to one of the corresponding XOR gates 68.

FIG. 4 shows the positively phase shifted data signal to be at C and the negatively phase shifted data signal to be a D prior to operation thereon by the pre-processor 60'. A signal at C is shifted by −90 degrees to the position A and a signal at D is shifted by +90 degrees to the A position. Again, with the phase modulation effectively eliminated, the digitized in-phase and quadrature outputs I' and Q' are read and processed by the radar signal processor 70 in a conventional manner.

Thus a system is provided for imposing a data signal on a radar signal and for removing said data signal prior to processing the radar returns. FIG. 2 shows a system 100 for receiving the transmitted data signal and extracting the data portion of the transmitted signal. The system 100 includes a dedicated antenna 102 and a dedicated data-link RF-IF convertor 104. Since the system may be mounted on a separate and independently mobile vehicle having an on-board radar system, a separate conventional radar antenna 106 and RF-IF convertor 108 is shown. The respective IF outputs of each convertor 104 and 108 are input to a common IF channel 110 via a switch or multiplexer 112. The IF signal is transformed to in-phase and quadrature signals by mixers 114 and 116 and digitized by A/D convertors 118 and 120 prior to being input to a filter processor 122. The provision of digitized in-phase and quadrature signals is conventional in this application and known in the art as discussed above. The filter processor 122 performs the function of extracting the data component of the signal transmitted by the system 10 of FIG. 1 from the digitized in-phase and quadrature representations of the IF signal provided by the data-link RF-IF convertor 104. The filter processor 122 provides an output to the on-board digital processor 124 via an I/O circuit 126 which is the phase angle of the transmitted signal.

Figure 5:
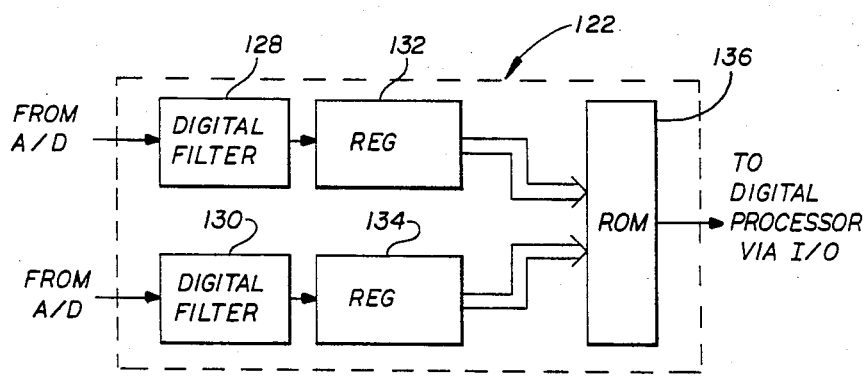
FIG. 5 is a block diagram representative of the filter processor of the present invention.
Figure 6:
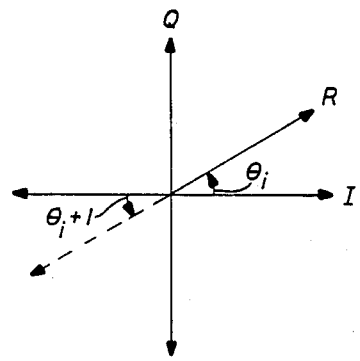
FIG. 6 is a phasor diagram of the signal processed by the filter processor of the present invention.

As shown in FIG. 5, the filter processor 122 includes first and second digital filters 128 and 130 for filtering the in-phase and quadrature signals respectively. Since the bandwidth of the data link signal is typically less than that of the IF channel, the filters 128 and 130 are provided to improved the signal-to-noise ratio and reduce adjacent channel interference. The digital filters 128 and 130 may be implemented using conventional FFTs (Fast Fourier Transform filters), DFTs (Discrete Fourier Transform filters), or FIRs (Finite Impulse Response filters). The filters 128 and 130 provide a plurality of weighted samples of the in-phase and quadrature signals which have been multiplied by a set of weighting coefficients. The filter outputs are stored in data registers 132 and 134 and used as addresses for a lookup table stored in a read only memory 136. The value of the arctan of the ratio of the sum of the digitized weighted O samples to the digitized weighted I samples represents the phase angle for a given pulse. By comparing the phase angle of adjacent pulses, the digital processor can extract the data message. That is, the first pulse transmitted is a reference pulse to which the digital processor 124 assigns, for example, a positive phase convention. As illustrated in FIG. 6, the phase angle $\theta i$ associated with a first pulse transmitted with a +90 degree phase shift is shown, for the purpose of illustration, in the first quadrant. The digital processor 124 looks at the location of the resultant vector R due to the next pulse $\theta i+1$. If the next resultant vector R is within 90 degrees of the first resultant vector, the received pulse will be interpreted as say a logical '0'. On the other hand, if the next resultant vector is within 90 and 270 degrees of the first vector, it will be interpreted as a logical '12'. Finally, if the next resultant vector is greater than 270 degrees from the first vector, it will be interpreted as a logical '0. Ambiguities at the 90 and 270 degree difference cross over points are resolved by ignoring the pulse initially and using conventional error correcting techniques to eliminate the noise associated therewith.

Thus, if the next pulse (i+1) had a −90 degree phase shift on transmission, the resultant vector would lie in the third quadrant and have a phase angle $\theta i+1$. The digital processor 124 interprets a phase angle $\theta$ in the range of from 0 to +90 degrees as a logical '1' and a phase angle $\theta$ in the range of from +180 degrees to +270 degrees as a logical '0'. This operation may be performed in software or firmware as in known in the art. The data message is thereby extracted from the transmitted signal.

Thus, the present invention provides a method and system for simultaneously transmitting a radar signal and a communication signal using a single transmitter and for receiving said radar transmission in a first receiver and for receiving said communication signal in a second receiver. While the method of operation of the present invention is evident from the above, it may be summarized as follows:

First a conventional radar signal is encoded with message data by a phase modulation technique and transmitted. Next, the transmitted signal is received by two receivers, the first of which decodes the received signal to extract and process the fundamental radar signal, the extraction being accomplished by providing digitized in-phase and quadrature representations of the received radar signal. Next, the phase shift of the received radar signal is detected and normalized in response thereto. That is, the phase of the in-phase and quadrature signals is shifted in response to the known phase shift of said transmitted radar signal by said first value in a first embodiment or shifted by a first or second value in response to the known phase shift or the transmitted signal in accordance with a second embodiment.

In the second receiver, the received signal is decoded to extract the phase angle of the transmitted signal. This is accomplished by first digitizing the in-phase and quadrature signals representing said encoded radar signal in a conventional manner. The arctan of the ratio of the sum of the quadrature signals to the in-phase signals provides the phase angle of the received pulse. The range of the phase angle provides the message data.

While the present invention has been described herein with reference to a particular embodiment for a particular application, it is understood that the invention is not limited thereto. Those of ordinary skill in the art will recognize additional modifications, applications and embodiments within the scope thereof. For example, the invention is not limited to a radar system. It may be used in connection with other communication systems where it is desired to impose one signal on another for transmission to two or more receivers. As mentioned above, the invention is not limited to any technique for modulating the phase of the fundamental frequency with a message signal. Alternate schemes are shown herein for shifting the phase of the received signal to eliminate the modulating signal to illustrate that the invention is not limited to a particular technique. Finally, by way of illustration, the invention is not limited to the use of a lookup table to determine the phase of the signal received in the second receiver. The phase angle may be computed or measured by other means as is known in the art. It is intended by the appended Claims to cover these and other modifications, applications and embodiments within the scope of the invention.

What is claimed is:

1. A combined radar and communication system including means for providing simultaneous radar and communication functions, said means including:
    a transmitter including means for encoding a radar transmit signal with message data, said transmitter including means for modulating the phase of said transmitted signal with message data, said means for modulating the phase of said transmitted signal including means for generating a first signal having a phase component, said means for modulating the phase of said transmitted signal including mixer means for modulating said first signal with said message data to produce said encoded radar signal;
    a first receiver including means for decoding returns from said transmitted signal to eliminate said message data; and
    a second receiver including means for decoding said radar signal to extract said message data.

2. A combined radar and communication system including means for providing simultaneous radar and communication functions, said means including:
    a transmitter including means for encoding a radar transmit signal with message data;

a first receiver including means for decoding returns from said transmitted signal to eliminate said message data, said first receiver including means for decoding returns from said transmitted signals to provide digitized in-phase and quadrature signals representing said received radar returns; and a second receiver including means for decoding said radar signal to extract said message data.

3. The combined radar and communication system of claim 2 wherein said means for decoding returns from said transmitted signal includes first data processing means for eliminating said message data from said in-phase and quadrature signals and data buffer means for storing message data.

4. The combined radar and communication system of claim 3 wherein said first data processing means includes means for changing the sign of said in-phase and quadrature signals in response to corresponding transmitted message data.

5. The combined radar and communication system of claim 4 wherein said means for changing the sign of said in-phase and quadrature signals includes first and second register means for storing said in-phase and quadrature signals respectively and providing an output bit representative of the sign thereof.

6. The combined radar and communication system of claim 5 wherein said means for changing the sign of said in-phase and quadrature signals further includes first and second exclusive-or gates each having a first input from said data buffer means and a second input being the sign bit of the in-phase and quadrature signals respectively from said first and second register means, the outputs of said first and second exclusive-or gates being provided as replacement sign bits to said first and second registers respectively.

7. The combined radar and communication system of claim 3 wherein said first data processing means includes means for changing the sign of either said in-phase or said quadrature signals in response to transmitted message data.

8. The combined radar and communication system of claim 7 wherein said means for changing the sign of either said in-phase or said quadrature signals includes first and second register means for storing said in-phase and quadrature signals respectively and providing an output bit representative of the sign thereof.

9. The combined radar and communication system of claim 8 wherein said means for changing the sign of either said in-phase or said quadrature signals further includes first and second exclusive-or gates, said first gate having a first inverted input from said data buffer means and a second input being the sign bit of the in-phase signal from said first register, said second gate having a first input from said data buffer means and a second input being the sign bit of the quadrature signal from said second register, and the outputs of said first and second exclusive-or gates being provided as replacement sign bits to said first and second registers respectively.

10. A combined radar and communication system including means for providing simultaneous radar and communication functions, said means including:
a transmitter including means for encoding a radar transmit signal with message data;
a first receiver including means for decoding returns from said transmitted signal to eliminate said message data; and a second receiver including means for decoding said radar signal to extract said message data, said second receiver including means for providing digitized in-phase and quadrature signals representing said transmitted signals.

11. The combined radar and communication system of claim 10 wherein said second receiver includes means for ascertaining the phase relationship between successive samples of digitized in-phase and quadrature signals received from said transmitter.

12. The combined radar and communication system of claim 11 wherein said means for ascertaining the phase relationship between successive samples includes a look-up table means.

13. The combined radar and communication system of claim 11 further including means for filtering said digitized in-phase and quadrature signals prior to determining the phase relationship therebetween.

14. A method for simultaneously transmitting a radar signal and a communication signal using a single transmitter and for receiving said radar transmission in a first receiver and for receiving said communication signal in a second receiver, including the steps of:
(a) encoding a radar signal with a communication signal, further including the steps of:
  (i) modulating the phase of the radar with the communication signal,
  (ii) digitizing the communication signal,
  (iii) shifting the phase of the radar signal by a first value or a second value depending on the instantaneous logical state of the communication signal, and
  (iv) providing digitized in-phase and quadrature representations of the received radar signal;
(b) receiving said encoded radar signal in a first receiver;
(c) decoding said received radar signal to extract said radar signal;
(d) receiving said encoded radar signal in a second receiver; and
(e) decoding said received radar signal to extract said communication signal.

15. The method of claim 14 wherein the step of decoding said received radar signal to extract said radar signal further includes the step of providing the phase shift of the transmitted radar signal and normalizing said received radar signal in response thereto.

16. The method of claim 15 wherein the step of decoding said received radar signal to extract said radar signal further includes the step of shifting the phase of the in-phase and quadrature signals in response to the phase shift of said transmitted radar signal by said first value.

17. The method of claim 15 wherein the step of decoding said received radar signal to extract said radar signal further includes the step of shifting the phase of the in-phase signal in response to the phase shift of said transmitted radar signal by said first value.

18. The method of claim 16 wherein the step of decoding said received radar signal to extract said radar signal further includes the step of shifting the phase of the quadrature signal in response to the phase shift of said transmitted radar signal by said second value.

19. A method for simultaneously transmitting a radar signal and a communication signal using a single transmitter and for receiving said radar transmission in a first receiver and for receiving said communication signal in a second receiver, including the steps of:

(a) encoding a radar signal with a communication signal;

(b) receiving said encoded radar signal in a first receiver;

(c) decoding said received radar signal to extract said radar signal;

(d) receiving said encoded radar signal in a second receiver, including the step of providing digitized in-phase and quadrature signals representing said encoded radar signal; and (e) decoding said received radar signal to extract said communication signal.

20. The method of claim 19 wherein the step of decoding said received radar signal to extract said communication signal includes the step of comparing successive samples of said digitized signals.

21. The method of claim 20 wherein the step of decoding said received radar signal to extract said communication signal further includes the step of extracting the phase angle between successive samples of said in-phase signals and said quadrature signals and extracting said transmitted signal from said phase angle.

22. A combined radar and communication system including means for providing simultaneous radar and communication functions, said means having a first receiver including:

means for decoding returns from a transmitted signal having message data encoded thereon, to eliminate message data therefrom and means for providing digitized in-phase and quadrature signals representing said received radar returns.

23. The combined radar and communication system of claim 22 wherein said means for decoding returns from said transmitted signal includes first data processing means for eliminating said message data from said in-phase and quadrature signals and data buffer means for storing message data.

24. The combineds radar and communication system of claim 23 wherein said first data processing means includes means for changing the sign of said in-phase and quadrature signals in response to corresponding transmitted message data.

25. The combined radar and communication system of claim 24 wherein said means for changing the sign of said in-phase and quadrature signals includes first and second register means for storing said in-phase and quadrature signals respectively and providing an output bit representative of the sign thereof.

26. The combined radar and communication system of claim 25 wherein said means for changing the sign of said in-phase and quadrature signals further includes first and second exclusive-or gates each having a first input from said data buffer means and a second input being the sign bit of the in-phase and quadrature signals respectively from said first and second register means, the outputs of said first and second exclusive-or gates being provided as replacement sign bits to said first and second registers respectively.

27. The combined radar and communication system of claim 23 wherein said first data processing means includes means for changing the sign of either said in-phase or said quadrature signals in response to transmitted message data.

28. The combined radar and communication system of claim 27 wherein said means for changing the sign of either said in-phase or said quadrature signals includes first and second register means for storing said in-phase and quadrature signals respectively and providing an output bit representative of the sign thereof.

29. The combined radar and communication system of claim 28 wherein said means for changing the sign of either said in-phase or said quadrature signals further includes first and second exclusive-or gates, said first gate having a first inverted input from said data buffer means and a second input being the sign bit of the in-phase signal from said first register, said second gate having a first input from said data buffer means and a second input being the sign bit of the quadrature signal from said second register, and the outputs of said first and second exclusive-or gates being provided as replacement sign bits to said first and second registers respectively.

30. A combined radar and communication system including means for providing simultaneous radar and communication functions, said means including receiver means for decoding a transmitted radar signal encoded with message data to extract said message data said receiver including means for providing digitized in-phase and quadrature signals representing said transmitted signals.

31. The combined radar and communication system of claim 30 wherein said receiver includes means for ascertaining the phase relationship between successive samples of digitized in-phase and quadrature signals received from said transmitter.

32. The combined radar and communication system of claim 31 wherein said means for ascertaining the phase relationship between successive samples includes a look-up table means.

33. The combined radar and communication system of claim 32 further including means for filtering said digitized in-phase and quadrature signals prior to determining the phase relationship therebetween.

34. A combined radar and communication system including means for providing simultaneous radar and communication functions, said means including:

a transmitter including means for encoding a radar transmit signal with message data, said transmitter including means for modulating the phase of said transmitted signal with message data, said means for modulating the phase of said transmitted data including means for generating a first signal having a first signal component and means for modulating said first signal with said message data to produce said encoded radar signal.

* * * * *